Jan. 14, 1964    H. SCHLEICHER    3,117,432
CLUTCH ARRANGEMENT
Filed April 13, 1962
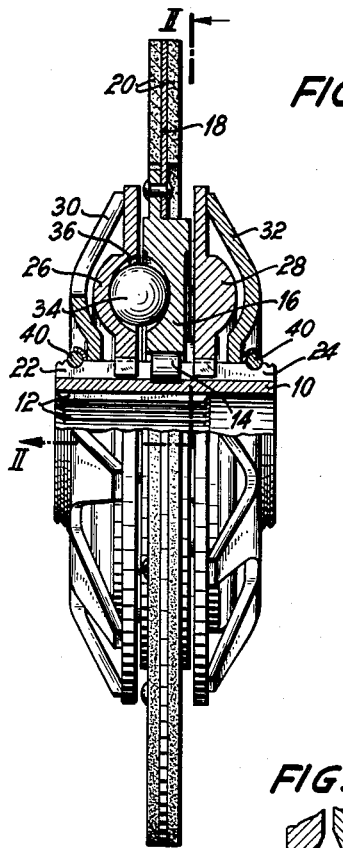
FIG. 1
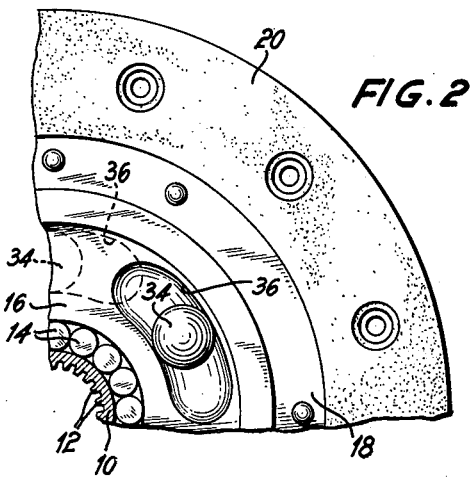
FIG. 2
FIG. 3
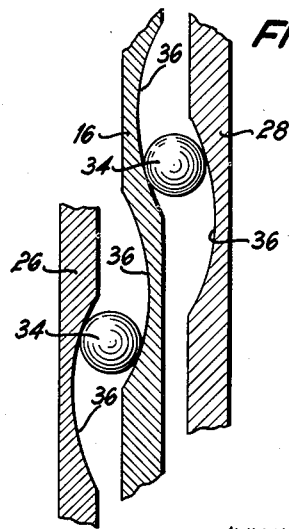
FIG. 4
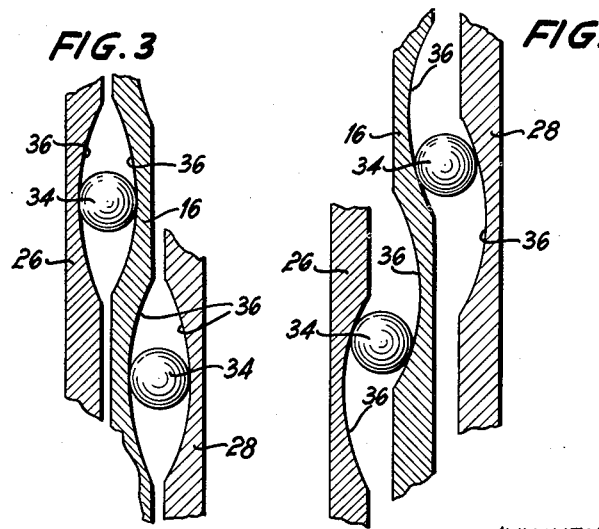
INVENTOR
Hans Schleicher
By Richard Grub
Agt

United States Patent Office 3,117,432
Patented Jan. 14, 1964

3,117,432
CLUTCH ARRANGEMENT
Hans Schleicher, Munich, Germany, assignor to Fichtel & Sachs A.G., Schweinfurt (Main), Germany, a corporation of Germany
Filed Apr. 13, 1962, Ser. No. 187,398
Claims priority, application Germany Apr. 14, 1961
4 Claims. (Cl. 64—27)

This invention relates to clutches, and more particularly to an arrangement for damping oscillating variations in the torque transmitted by the clutch.

The torque generated by the internal combustion engine of a vehicle is not uniform but varies periodically, reaching a maximum during the power stroke of each cylinder. For smoother application of power to the wheels, automotive engines are usually equipped with flywheels. In light vehicles driven by relatively weak engines, the mass of the flywheel must be held to a minimum. For this reason, such vehicles cannot readily be operated in high gear at low speeds when the power strokes of the engine are separated by relatively long intervals. This problem is more serious in a two-cylinder engine than in one having a greater number of cylinders, and is less severe in an engine operating in a two-stroke cycle than in a four-stroke engine.

To overcome the consequences of intermittent power supply by a two-cylinder four-stroke engine and the like at low engine speeds, it is known to provide means for damping torsional oscillations in the power train of the vehicle. Known devices essentially consist of a resilient connection between a clutch disk of the usual friction clutch and the shaft with which the disk rotates. The known devices permit only a small measure of relative rotation of the disk and the shaft, and the spring elements which resiliently connect them must have a correspondingly steep characteristic. Such stiff springs, however, cannot fully absorb the oscillating variations in engine torque, and a two-cylinder four-stroke automotive engine equipped with the known device gives a very uncomfortable ride when operated in high gear at low rotary speed.

The object of the instant invention is the provision of means for damping oscillating variations in the torque transmitted by a clutch.

A more specific object are damping means which permit relative rotary movement of two elements of a power train through a relatively large angle against the resistance of a resilient element so that the spring characteristics of the damping means are not very steep.

With these and other objects in view, the invention in one of its aspects provides a pressure member which is axially movable relative to a clutch disk, and resilient means which permanently urge axially opposite radially extending faces of the disk and the pressure member toward each other. At least one of these faces has a circumferentially elongated groove in which a coupling member of circular cross section such as a ball is circumferentially movable while in simultaneous axial abutting engagement with both faces. The groove has a portion of greatest depth, and tapers in depth circumferentially away from that deepest portion. An increase in the torque transmitted by the clutch causes the ball to move circumferentially to a shallower portion of the groove against the restraint of the resilient means, and the latter return the ball to the deepest groove portion when the torque is reduced.

The exact nature of this invention as well as other objects and advantages thereof will be readily apparent from consideration of the following specification relating to the annexed drawing in which:

FIG. 1 is a fragmentary side-elevational view of an automotive friction clutch, partly in section on an axial elevational plane, and showing only those elements of the structure which are directly related to this invention;

FIG. 2 shows the apparatus of FIG. 1 in section on the line II—II;

FIG. 3 is a conventional developed view of a detail of the clutch of FIG. 1 taken on a circle about the clutch axis, and showing working elements of the clutch in a rest position when minimum torque is transmitted; and FIG. 4 shows a view corresponding to that of FIG. 3 with the working elements in a position assumed when transmitting high torque.

Referring now to the drawing in detail, and initially to FIGS. 1 and 2, there is seen a tubular hub 10 equipped with axially elongated internal teeth 12 for driving engagement with a conforming drive shaft not itself shown. A roller bearing 14 coaxial with the hub 10 is mounted thereon, and is about equidistant from the two axial ends of the hub. The bearing supports a freely rotatable clutch disk 16. An annular sheet metal plate 18 is riveted to the outer circumference of the clutch disk 18 and has friction facings 20 attached to its opposite radial faces.

Those portions of the clutch which receive torque from a power source, such as an internal combustion engine, have not been illustrated since they may be entirely conventional. They may include two pressure plates secured on the output shaft of the engine against rotation, and heavy springs normally urging the plates from opposite directions into engagement with the two friction facings 20, and operator-actuated controls for axially withdrawing the plates from the facings 20. One of the pressure plates may constitute a flywheel.

On either side of the roller bearing 14, the hub 10 carries a plurality of circumferentially spaced axially elongated splines 22, 24 on which two pressure disks 26, 28 are respectively movable in an axial direction toward and away from the clutch disk 16 while being prevented from rotating relative to the hub 10. Two approximately star-shaped plate springs 30, 32 are axially slidable and rotatable on the hub 10 and their central portions abut against respective snap rings 40 on the hub. Their peripheral portions urge the pressure disks toward the clutch disk 16.

Each of the two radial faces of the clutch disk 16 has three depressions or grooves 36 of identical shape and size only partly visible in the drawing. The grooves 36 are about kidney-shaped when viewed in the direction of the clutch axis, and are elongated circumferentially along a circular reference line. The grooves 36 have their deepest and widest portion in the center, and become shallower toward their circumferential ends. They are spaced on each disk face 120° center to center, and the group of three grooves on one face is offset 60° about the clutch axis relative to the group of grooves on the other disk face, as is best seen in FIG. 2, thereby making it possible that the deepest center portions on the grooves on both faces extend in a common axial plane. The axial thickness of the clutch disk 16 is much smaller than the combined depth of the two grooves on opposite faces, as best seen in FIG. 4.

Those faces of the pressure disks 26 which are located opposite the clutch disk faces have three corresponding grooves substantially identical in dimensions, shape, and disposition to the grooves on the opposite clutch disk face. Six bearing balls 34 are received in the cavities constituted by corresponding pairs of grooves 36 of the clutch disk faces and opposite pressure disk faces. The radius of each bearing ball 34 is slightly greater than the greatest axial depth of each groove 36. When the clutch disk 16 is angularly aligned with the pressure disks 26, 28 in such a manner that the balls 34 are simultaneously located in the deepest central portions of the corresponding grooves 36, the faces of disks are still spaced from each other, and the balls are held in abutment against respective portions of these faces at the bottoms of the grooves 36 by the pressure of the springs 30, 32, as seen in FIGS. 1, 2 and 3.

When torque is transmitted by the clutch, the clutch disk 16 is connected to the engine by two pressure plates, or by a pressure plate and the flywheel. The load constituted mainly by the inert mass of the vehicle and connected to the hub 10 by the non-illustrated drive shaft, causes relative angular displacement of the clutch disk 16 and the pressure disks 26, 28, and the balls 34 are forced from the deepest central portions of the grooves 36 into the shallower circumferential end portions of these grooves, thereby axially moving the pressure disks 26, 28 away from the clutch disk 16 against the pressure of the plate springs 30, 32.

When during normal power transmission by the clutch the torque increases during each power stroke of the engine, and decreases during the suction, compression, and exhaust strokes, the clutch disk 16 alternatingly moves faster and slower than the pressure disks 26, 28. The balls 34 roll back and forth between the ends of the grooves 36 in an oscillating movement the amplitude of which is limited by the springs 30, 32. The oscillating variations in the torque transmitted by the clutch are damped out.

The slope of the groove bottoms may be chosen to permit relatively great angular movement of the clutch disk 16 relative to the pressure disks 26, 28 with very little deformation of the plate springs 30, 32. In the illustrated embodiment of the invention, the groove bottoms guide the balls 34 approximately in circular arcs relative to the corresponding disk, but the ascending path of the ball may be shaped in any other manner to achieve a desired response of the clutch to applied variable torque. Any practical resiliency characteristics may thus be obtained by selection of groove shapes and groove dimensions.

Further adaptation of the clutch arrangement to specific service conditions is possible by selection of plate springs 30, 32 of appropriate material properties, dimensions, and shape. Those skilled in the art will find the clutch arrangement of the invention to be versatile enough to adequately prevent transmisison of oscillating torque variations from any two-cylinder four-stroke engine to the wheels of a light vehicle in high gear when running at low speeds.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What I claim is:

1. In a clutch arrangement for selectively coupling driving and driven shaft means, in combination:
   (a) a disk member having an axis and two opposite radially extending faces;
   (b) two pressure members axially movable relative to said disk member, said pressure members having each a radially extending pressure face opposite one of the faces of said disk member, each face of said disk member and the opposite pressure face constituting a pair of faces;
   (c) resilient means permanently urging said faces of each pair toward each other,
   (d) the faces of said disk member each being formed with a plurality of circumferentially spaced circumferentially elongated grooves, each groove having a portion of greatest axial depth and tapering circumferentially in a direction away from said portion, the grooves on one face of said disk member being angularly offset relative to said axis from the grooves on the other face of said disk member in such a manner that each groove on said one face is angularly interposed between two grooves of the other face;
   (e) a coupling member of circular cross section circumferentially movable in each groove in simultaneous axial abutment against the faces of the corresponding pair;
   (f) engaging means on said disk member for connecting the same to one of said shaft means for joint rotation; and
   (g) connecting means for operatively connecting said pressure members to the other one of said shaft means for joint rotation.

2. In a clutch arrangement for selectively coupling driving and driven shaft means, in combination:
   (a) a hub member having an axis;
   (b) connecting means for operatively connecting said hub member to one of said shaft means for joint rotation therewith;
   (c) a disk member mounted on said hub member for rotation about said axis, said disk member having two opposite radial faces,
      (1) each face being formed with a plurality of grooves elongated in an arc about said axis,
      (2) each groove having a center portion and two longitudinal end portions spaced from said center portion in opposite circumferential directions, said groove tapering in axial depth from said center portion toward said end portions thereof,
      (3) the grooves on one of said faces being angularly offset relative to said axis from the grooves on the other face in such a manner that each groove on said one face is angularly interposed between two grooves of the other face,
      (4) the center portions of the grooves on said two opposite faces extending in a common radial plane;
   (d) a spherical coupling member partly received in each groove and axially projecting therefrom;
   (e) two pressure members secured on said hub member against rotation about said axis, and axially slidable on said hub member toward and away from respective ones of said radial faces,
      (1) each pressure member having a radial pressure face opposite the corresponding radial face of said disk member;
   (f) two resilient means mounted on said hub member and permanently urging respective ones of said pressure members toward said disk member for abutting engagement of said pressure faces with the coupling members received in the respective faces of said disk member; and
   (g) engaging means on said disk member for connecting the same to the other one of said shaft means for joint rotation.

3. In a clutch arrangement as set forth in claim 2, said pressure faces each being formed with a plurality of grooves elongated in an arc about said axis, each groove having a center portion and two longitudinal end portions spaced from said center portion in opposite circumferential directions, said grooves tapering in axial depth from said center portion toward said end portions thereof, each of the grooves in said pressure faces abuttingly receiving the projecting portion of a respective one of said coupling members.

4. In a clutch arrangement as set forth in claim 3, the grooves in said disk member and in said pressure members being equally spaced from said axis.

References Cited in the file of this patent

UNITED STATES PATENTS

| | | |
|---|---|---|
| 845,094 | Jezler | Feb. 26, 1907 |
| 2,613,785 | Mohns | Oct. 14, 1952 |
| 2,659,220 | Cherry | Nov. 17, 1953 |
| 3,050,965 | Landrum | Aug. 28, 1962 |

FOREIGN PATENTS

| | | |
|---|---|---|
| 242,413 | Great Britain | Nov. 12, 1925 |